United States Patent
Sauerwein et al.

(10) Patent No.: US 7,144,941 B2
(45) Date of Patent: Dec. 5, 2006

(54) FLAME RETARDANT POLYMER COMPOSITION

(75) Inventors: Reiner Sauerwein, Steinberg (DE); Dieter Prescher, Schwandorf (DE); Josef Brandl, Teublitz (DE); Hans Gokorsch, Schwandorf (DE)

(73) Assignee: Nabaltec GmbH, Schwandorf (DE)

( * ) Notice: Subject to any disclaimer, the term of this patent is extended or adjusted under 35 U.S.C. 154(b) by 344 days.

(21) Appl. No.: 10/688,060

(22) Filed: Oct. 16, 2003

(65) Prior Publication Data

US 2004/0147659 A1   Jul. 29, 2004

(30) Foreign Application Priority Data

Oct. 16, 2002   (DE) ................ 102 48 174

(51) Int. Cl.
*C08K 3/22*   (2006.01)

(52) U.S. Cl. ...................... 524/437; 423/629

(58) Field of Classification Search ............... 423/629; 524/437

See application file for complete search history.

(56) References Cited

U.S. PATENT DOCUMENTS 5,127,950 A   7/1992 Bongartz et al.

FOREIGN PATENT DOCUMENTS

| CN | 87 1 07410 | * | 8/1988 |
|---|---|---|---|
| CN | 87 1 07410 A | | 8/1988 |
| EP | 0 158 040 A1 | | 10/1985 |
| EP | 0 982 361 A1 | | 3/2000 |
| EP | 1 146 075 A1 | | 10/2001 |
| GB | 2 151 236 A | | 7/1985 |
| GB | 2 231 333 A | | 11/1990 |
| JP | 63-139364 | * | 6/1988 |

OTHER PUBLICATIONS

G. Kirschbaum: "Halogenfreier Flammschutz"; Kunststoffe, 79, 1989, pp. 1205-1208.

R. Schmidt et al: "In situ Feuerloscher" (English Title: In Situ Fire Extinguischers); Kunststoffe, 88, 1998, pp. 2058-2061, (Abstract in english).

Lueger, Lexikon der Technik, vol. 48, p. 393-394; "MAHLTOCKENANLAGEN" (translation of encyclopedia article).

H. Baumann: "Apparatur nach Baumann zur Bestimmung der Flussigkeitsaufnahme von pulvrigen Substanzen" (English title: Baumann Apparatus for the Determination of the Fluid Take Up by Powdery Substances); Fette Seifen Anstrichmittel, vol. 68, No. 9, 1966, pp. 741-743 (Title and Abstract in English).

* cited by examiner

*Primary Examiner*—Peter Szekely
(74) *Attorney, Agent, or Firm*—Darby & Darby

(57) ABSTRACT

A flame retardant polymer composition consists of
  a) 20–60 percent by weight of a thermoplastic and/or cross-linked or cross-linkable elastomer and
  b) as a flame retardant agent 40–80 percent by weight either of an aluminum hydroxide with the material values
    specific surface according to BET 3–5 $mg^2/g$
    mean grain size $d_{50}$ 1.0–1.5 μm
    residual moisture 0.1–0.4%
    oil absorption 19–23%
    water absorption 0.4–0.6 ml/g
  or of an aluminum hydroxide with the material values
    specific surface according to BET 5–8 $m^2/g$
    mean grain size $d_{50}$ 0.8–1.3 μm
    residual moisture 0.1–0.6%
    oil absorption 21–25%
    water absorption 0.6–0.8 ml/g.

A process of producing the flame retardant agent is characterised in that a filter-moist aluminum hydroxide obtained by precipitation and filtration with a mean grain size of 0.8 to 1.5 μm is subjected to mill drying in a turbulent hot air stream in such a way that, while the grain distribution is largely retained, the BET surface is increased by at least 20%.

10 Claims, 4 Drawing Sheets

Figure 1

Water absorption according to Baumann for the inventive product A and the commercially available products B, C, and D.

Figure 3

MFI values as a function of the amino silane content.

Figure 4

Sheer viscosity of the compounds listed in Table 8

FLAME RETARDANT POLYMER COMPOSITION

The invention relates to a flame retardant polymer composition and to a process of producing a flame retardant agent.

In the construction, furniture, transport or electrical industry and in the electronics industry, plastics are used as materials. For many applications, polymers have to comply with national or international flame retardant standards. As most polymers, in themselves, are combustible, they have to be modified to be classified as being flame retardant. In general, this is achieved by adding organic or inorganic flame retardant agents. Within a multitude of different flame retardant agents, metal hydrates, more particularly those of aluminium, have become very important (G. Kirschbaum, Kunststoffe, 79, 199, pp. 1205–1208, and R. Schmidt, Kunststoffe, 88, 1998, pp. 2058–2061).

The flame retardant effect of the aluminium hydroxide is based on the thermal splitting-off of the chemically bonded water between 200–400° C. In the course of said endothermic decomposition of the hydroxide, energy is consumed and as a result, the surface of the plastic material is cooled. In addition, the released water vapour dilutes the combustible organic degradation products of the polymers. The aluminium oxide remaining as residue adsorbs polycyclic aromatic compounds which are formed when burning the polymer matrix. As these compounds are constituents of black smoke, aluminium hydroxide also contributes to a reduction of smoke density in the case of fire. Therefore, when using the non-poisonous and halogen-free aluminium hydroxide it is possible to produce halogen-free polymer compounds which are low in smoke production.

The disadvantage refers to the large quantities of aluminium hydroxide which have to be present in plastics to be able to comply with the various standards referring to flame retardant materials. Because of said large quantities, the processing methods for such flame retardant polymer mixtures, such as extrusion, are difficult and the mechanical properties of said compounds are often inadequate.

The achievable extrusion speed while coating copper veins or while applying the cable sheathing to a cable structure constitutes an important cost factor of cable production. Polymer compounds filled with finely precipitated aluminium hydroxides which, in addition to meeting standard electrical, mechanical and flame retardant requirements, permit a high extrusion speed are crucial for halogen-free frame retardant cables to gain market share compared to alternative technologies.

One possibility of achieving further improvements consists in applying a layer of organic additives, e.g. silanes or titanates to the aluminium hydroxide surface. If said coated aluminium hydroxides are mixed into thermoplastics, it is possible to achieve higher extrusion speeds.

It is the object of the invention to provide a polymer composition which is filled with standard large amounts of fine-precipitated aluminium hydroxide and which does not have the above-described disadvantages, but which, with filler levels up to 80%, can still be easily processed. Compared to coating methods, the production method is simple and cost-effective.

Said objective was achieved by using fine-precipitated aluminium hydroxide which is subjected to a special mill drying process. The mill drying unit consists of a rotor which is firmly mounted on a solid shaft and which rotates at a high circumferential speed. Said rotational movement in connection with a high air through-put converts the through-flowing hot air into extremely fast air vortices which take up the material to be dried, accelerate same and distribute same so finely that a larger surface is generated. After having been dried completely, the aluminium hydroxide particles transposed into a condition of turbulence leave the mill drying unit and are separated from the hot air and the vapor. The circumferential speed of the rotor ranges between 40–140 m/sec. The hot air used for drying purposes has a temperature of 150–450° C. The hot air stream may have a throughput of 3000–7000 $Bm^3/h$, and may be whirled such that the Reynold's factor is greater than 3,000. The energy introduced in the hot air stream may be in excess of 5000 $Bm^3/h$, at a temperature greater than 270° C. The circumferential speed of the rotor may be greater than 60 m/sec, or 70 m/sec. After mill drying, the BET surface may be increased by at least 20%. It is possible to use conventional mill drying units; for example see Lueger, Lexikon der Technik, volume 48, p. 394.

The ultra-fine hydroxide powder obtained in this way is characterised by a very low oil absorption. As compared to commercially available products, the oil absorption of the inventive product is reduced by at least 20%. This applies to a comparison with products which comprise a comparable degree of fineness and a comparable or even larger specific surface according to BET (Brunnauer, Emmet, Teller method).

In the case of the aluminium hydroxide in accordance with the invention, X-ray diffractometer scans, in addition to the expected crystal modification gibbsite, show a boehmite percentage of approximately 1%. This is the case if the hot air temperature selected for mill drying is >270° C. The commercially available fine-crystalline aluminium hydroxides used for comparative purposes are usually pure gibbsites In the inventive product, the boehmite percentage is largely found on the surface of the particles.

Water absorption was tested according to Baumann (H. Baumann, Fette, Seifen, Anstrichmittel, 68, 1966, 741–743). This method was used in order to differentiate minerals and mineral filler materials according to polarity and hydrophilicity. More particularly, the method is used for assessing the surface coating of inorganic filler materials with organic additives as to whether the respective filler material was sufficiently hydrophobized. Substances which absorb a big quantity of water per mass unit of filler material are more hydrophilic than those which absorb smaller quantities of water. The inventive flame retardant agents were compared with commercially available standard products. The water absorption rate of aluminium hydroxides in accordance with the invention is 35% and, respectively, 27% lower than that of commercially available comparative products.

The products produced in accordance with the above-mentioned method could be incorporated into polymers more easily and led to better rheological properties of the mixture than comparative products commercially available so far. It was recognized that the mineral filler materials used were more hydrophobic than the filler materials used so far. Surprisingly, the new filler materials are more compatible with the polymer matrix. The lower the degree of oil absorption, the less polymer is needed for wetting the mineral surface. If less polymer is used for wetting the mineral surface, more polymer chains are available inside the matrix for mutual sliding off. In the final analysis, polymer mixtures with filler materials with a low oil index have lower viscosity values than those produced with filler materials having a high oil absorption index. This applies to polymer melts and to reactive resins which are liquid at room temperature, prior to complete curing, even at high filler levels of up to 80%.

If the product characterised in this way is mixed into an unsaturated polyester resin (abbreviated UP resin), much lower viscosity values are identified than in case of mixtures containing commercially available comparative products at the same concentration. Accordingly, the inventive product is also suitable for producing mixtures with a higher filler level, which still flow very well. If relative viscosity values are compared, the viscosity of the inventive product with a filler level of 50% by weight is approximately 60% lower than that of standard products.

If the aluminium hydroxide dried in accordance with the above-mentioned method is incorporated into a thermoplastic polymer matrix via melt methods, the resulting compound comprises the expected low melt viscosities determined as melt indices. This effect is achieved with and without the use of standard low-molecular coupling agents, as illustrated by the concentration series tested with reference to a Ethyl-vinyl acetate copolymer (abbreviated: EVA or EVA-copolymer) and to an amino-silane (Example 4). The tests were carried out with fixed relationships of filler material and polymer and varying percentages of amino-silane. The inventive product was compared with commercially available standard products. As expected, the product in accordance with the invention comprises a higher melt flow index over the entire range. The increase in percentages with reference to the standard product ranged between 20 and 40%.

On the basis of the described aluminium hydroxide, polymer compounds in the form of simple basic polymer mixtures were produced, having technical significance for the application as halogen-free flame retardant cable sheathing or cable insulating material. Apart from the very advantageous mechanical and flame proofing properties, the resulting polymer compounds comprise excellent melt flow properties. As compared with standard products of the group of commercially available ultra-fine crystalline aluminium hydroxides, said high melt flow index and said viscosity respectively are particularly striking. For example the melt flow index of the polymer composition may be increased by at least 20% compound to standard aluminum hydroxides.

Said greatly improved melt flow properties of compounds with a high filler level constitute a basic precondition for achieving high extrusion speeds when applying said flame retardant materials to electrical conductors. Example 9) contains the results obtained when extruding two plastics compounds onto a copper conductor. When processing the mixture containing the inventive product, it was found that as compared to the compound containing the commercially available, the former comprises a lower melt pressure and a lower melt temperature while the remaining parameters remain constant, i.e. the extruder screw speed and the extraction speed. For the person entrusted with the extrusion process, this means that, by increasing the screw speed it is possible to use this mixture at higher extrusion and extraction speeds when producing insulated wires and cables.

Optionally, in connection with low melt viscosities and standard high filler levels, it is possible to increase the filler level further in order to achieve even better flame retardant polymer compounds. However, the melt viscosity and the mechanical properties can be kept at a normal level, which is not possible with standard products.

Below, the invention will be explained in greater detail with reference to several examples. Examples 1 and 2 refer to inventive products and their production.

Examples 3 to 9 contain comparative examples which demonstrate the advantages of the products in accordance with the invention.

EXAMPLES

Example 1) and 2) describe the production of the inventive product.

Example 1

The filter cake of a finely crystallised aluminium hydroxide with a specific surface of approx. 3 m$^2$/g and a residual moisture of approx. 50% by weight was introduced into a mill drying unit through conventional conveying elements. The solid matter introduced amounted to 200 kg/h. Hot air with an entering temperature of 270–290° C. was added. The quantity of air amounted to 5000 Bm$^3$/h. The rotational speed of the rotor was set at 80 m/sec. The dried product was separated by a sufficiently dimensioned product filter and removed via a rotary valve.

Table 1) summarises the most important properties of the powder obtained in his way and compares same with the properties of three commercially available flame retardant agents based on ultra-fine aluminium hydroxide. The comparative product B was obtained on the basis of the same filter-moist ultra-fine hydroxide as the inventive product A.

The inventive product A and the comparative products B, C and D were subjected to a water absorption test according to Baumann. The device and the test method are described in H. Baumann, GIT-Fachzeitschrift für das Laboratorium, Heft 6, 6. Juni 1967, pp. 540–542 and in H. Baumann, Fette, Seifen, Anstrichmittel, 68, 1966, pp. 741–743.

Figure 1:
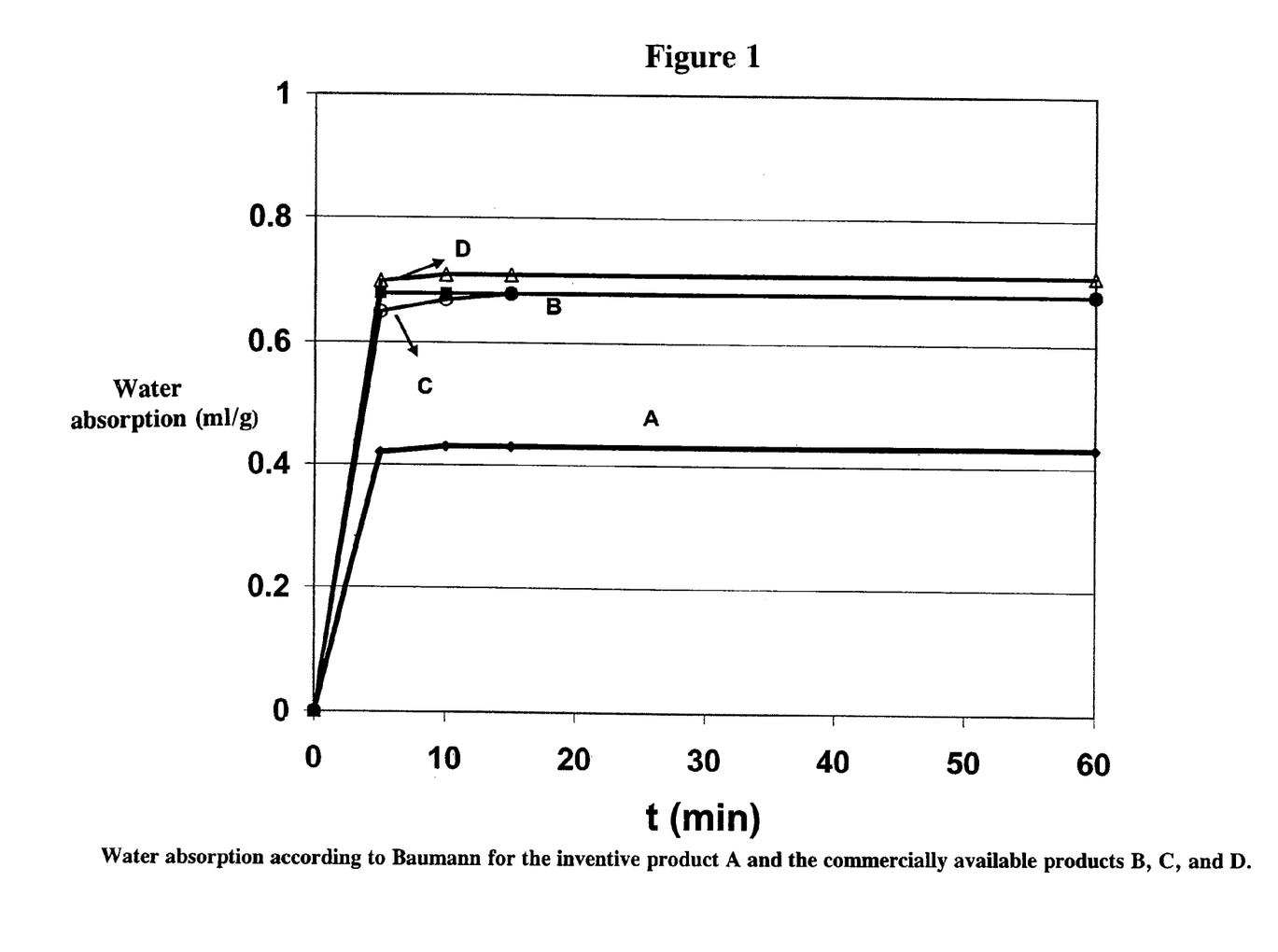

FIG. 1 shows the water absorption of the flame retardant agents compared as a function of the test duration. After 5–15 minutes, the products are saturated with water. A longer test period does not increase the water absorption rate any further. The water absorption rate of the inventive product A is at least 36% lower than that of the comparative products. This value is identical with the oil absorption values. Product A is already saturated at 21% (0.21 g oleic acid per 1 g filler material) while the commercially available products are saturated at 27–35%.

TABLE 1

| Property | Method | "4 m$^2$/g aluminium hydroxides" | | | |
| --- | --- | --- | --- | --- | --- |
| | | Product A | Product B | Product C | Product D |
| d90 (μm) | Laser granulometry | 0.5 | 0.5 | 0.6 | 0.6 |
| d50 (μm) | Laser granulometry | 1.2 | 1.4 | 1.6 | 1.6 |
| d10 (μm) | Laser granulometry | 2.6 | 3.2 | 3.4 | 5.3 |
| BET (m$^2$/g) | DIN 66131 | 3.8 | 3.1 | 3.5 | 4.6 |
| Boehmite (%) | XRD | 1% | — | — | — |

TABLE 1-continued

| | | "4 m²/g aluminium hydroxides" | | | |
|---|---|---|---|---|---|
| Property | Method | Product A | Product B | Product C | Product D |
| Moisture (%) | DIN EN ISO 787-2 | 0.19 | 0.19 | 0.24 | 0.23 |
| Oil absorption (%) | DIN EN ISO 787-5 | 21 | 27 | 29 | 35 |
| Water absorption (ml/g) | acc. to Baumann | 0.43 | 0.68 | 0.68 | 0.71 | d90 describes the grain size value for which applies that 90% of all particles are larger.
d50 describes the mean grain diameter and thus the value for which applies that 50% of all particles are larger and 50% of all particles are smaller.
d10 describes the grain size value for which applies that 10% of all particles are larger.

Example 2

The filter cake of a finely crystallised aluminium hydroxide with a specific surface of approx. 5 m²/g and a residual moisture of approx. 53% by weight was introduced into a mill drying unit through conventional conveying elements. The solid matter introduced amounted to 200 kg/h. Hot air with an entering temperature of 250–280° C. was added. The quantity of air amounted to 5000 Bm³/h. The rotational speed of the rotor was set between 2000–3000 rpm. The dried product was separated by a sufficiently dimensioned product filter and removed via a rotary valve.

Table 2) summarises the most important properties of the powder E obtained in his way and compares same with the properties of the commercially available product F. In addition, Table 2) contains the data of a product G which was produced on the basis of the same filter-moist ultra-fine hydroxide as the inventive product E, but according to the method on which the commercially available product F is based.

Figure 2:
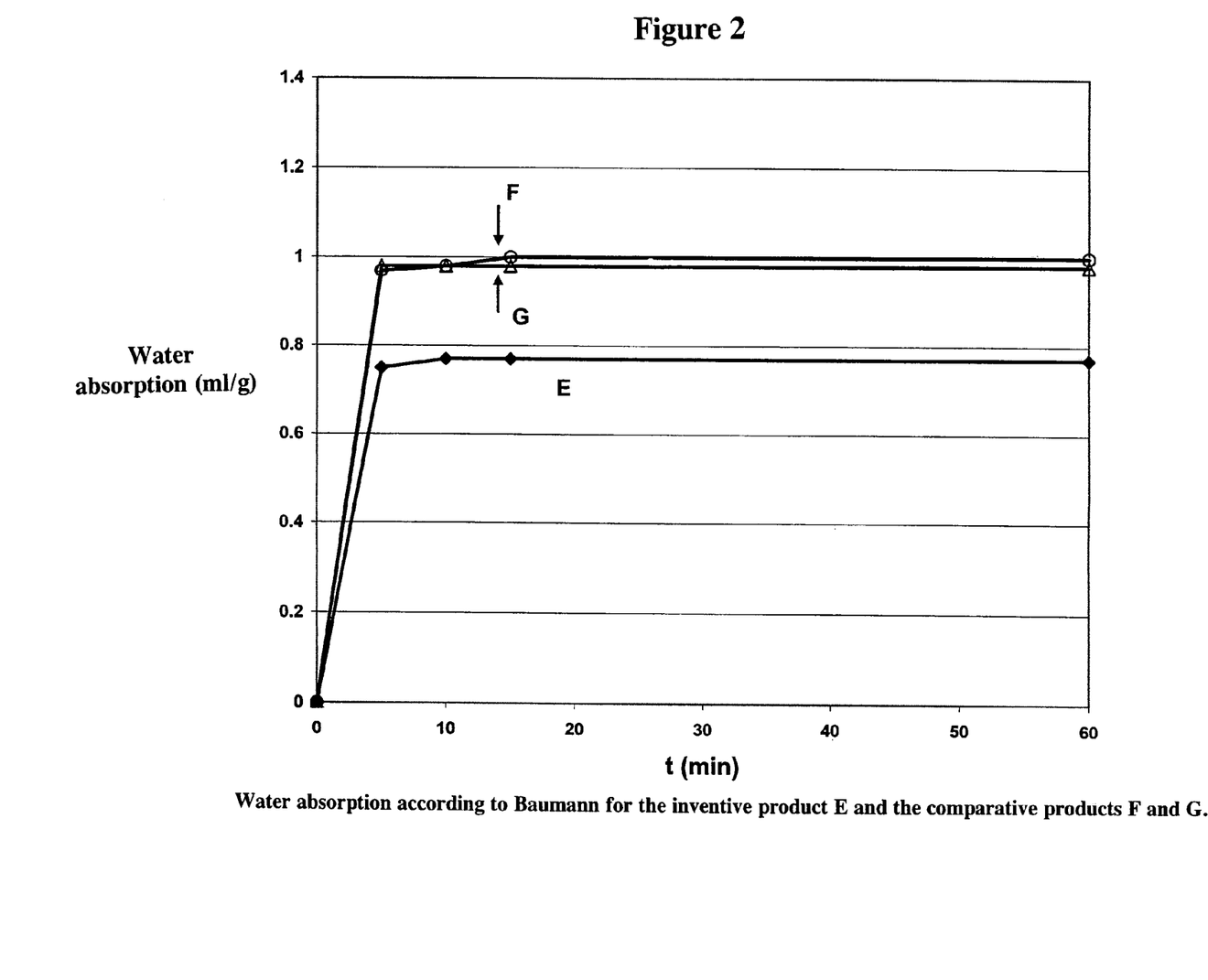

The inventive product E and the commercially available products F and as well as product G were subjected to a water absorption test according to Baumann. FIG. 2 shows the water absorption rates of the two filler materials as a function of the test duration. After 5–15 minutes, the products are saturated with water. A longer test period does not increase the water absorption rate any further. The water absorption rate of the inventive product E is at least 27% lower than that of the products F and G. This value is identical with the oil absorption values. Product E is already saturated at 24%, product F only at 34%. Product G, too, at 31%, comprises an oil absorption index which is approximately 30% higher than that of the inventive product E.

TABLE 2

| | | "6 m²/g aluminium hydroxides" | | |
|---|---|---|---|---|
| Property | Method | Product E | Product F | Product G |
| d90 (µm) | Laser granulometry | 0.5 | 0.5 | 0.6 |
| d50 (µm) | Laser granulometry | 0.0 | 1.1 | 1.1 |
| d10 (µm) | Laser granulometry | 2.6 | 2.7 | 2.4 |
| BET (m²/g) | DIN 66131 | 6.9 | 6.0 | 5.2 |
| Boehmite (%) | XRD | 1% | — | — |
| Moisture (%) | DIN EN ISO 787-2 | 0.19 | 0.40 | 0.26 |
| Oil absorption (%) | DIN EN ISO 787-5 | 24 | 34 | 31 |
| Water absorption (ml/g) | acc. to Baumann | 0.77 | 1.00 | 0.98 |

Example 3

The inventive product A and the comparative products B, C and D were mixed with Palapreg P17, an unsaturated polyester resin, manufactured by BASF AG. An agitator of type IKA-RE 166 was used for introducing the filler material. Identical quantities of Palapreg P17 and filler material were introduced for 3 minutes at 3500 rpm and subsequently again for 2 minutes at 5500 rpm, to obtain a finely distributed mixture with a filler level of 50% by weight. The filled resin obtained in this way was thermostated for 2 hours at 22° C. and subsequently measured in a Brookfield RVT viscometer at 20 rpm (using spindle 6). Table 3) compares the results.

TABLE 3

| Flame retardant agent | Absolute viscosity (Pas) | Rel. viscosity |
|---|---|---|
| Without | 3.81 | 1 |
| Product A | 32.4 | 8.5 |
| Product B | 95.2 | 25.0 |
| Product C | 99.0 | 26.0 |
| Product D | >200 | — |

The viscosity of Product A is by far the lowest. Products B and C are more viscous by the factor 3 and product D, because of too high a viscosity, cannot be measured in the device used.

Example 4

Figure 3:
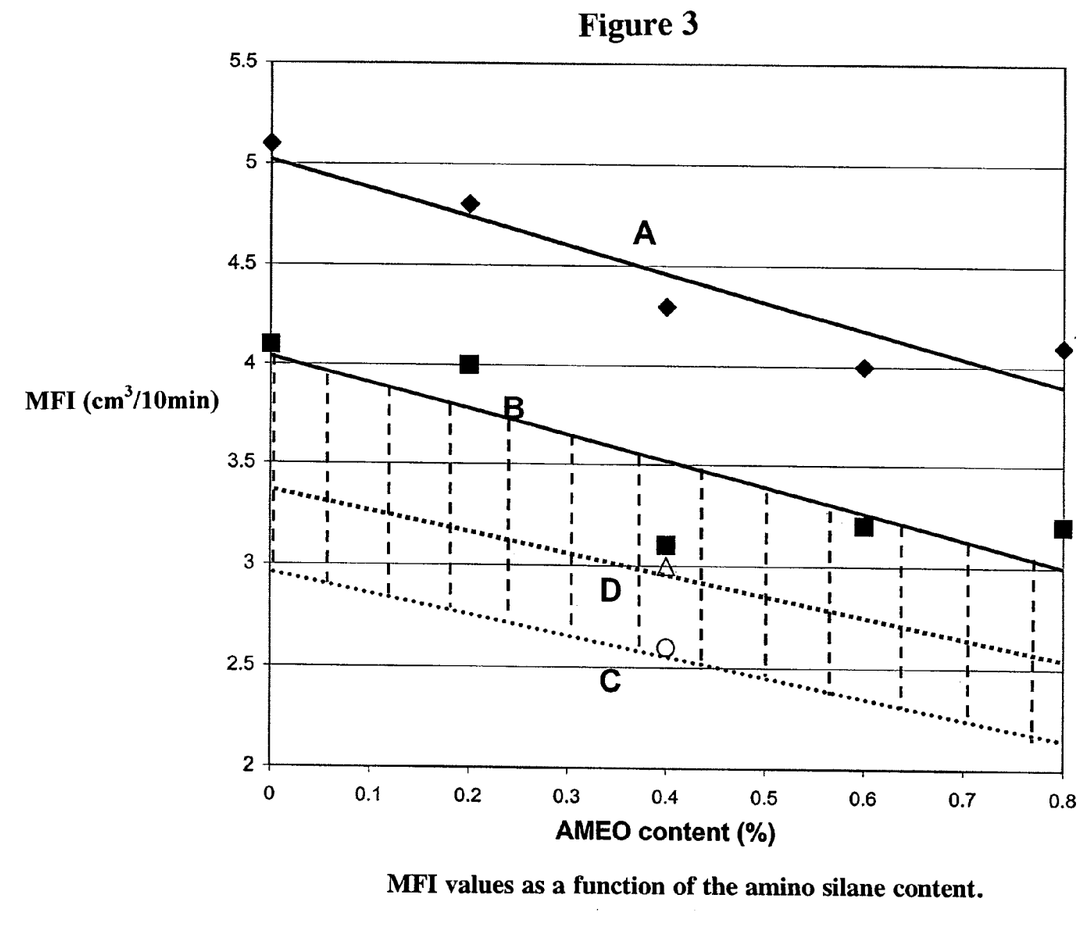

The inventive product A and the comparative products were mixed into an EVA copolymer with a vinyl acetate content of 19% by weight. The filler material amounted to a constant 61.3% by weight and the content of the amino silane used as a coupling agent (Dynasylan AMEO, manufacturer Degussa AG) was varied. The mixtures were produced on a dispersion kneading machine of type LDUK, 1.0 manufactured by Werner und Pfleiderer. The melt flow index was measured according to ASTM D 1238 in a Melt Flow Tester 6942 (190° C./21.6 kg). FIG. 3 shows the relationships of the melt flow indices obtained.

Throughout, Product A comprises higher MFI values. The value curves for Products A, B, C and D extend downwards in parallel with an increasing amino silane content.

Examples 5) to 10) summarize test results which were obtained in connection with user-relevant thermoplastic plastics compounds.

Example 5

Table 4) summarizes the compositions and the most important parameters of a polymer compound based on an EVA copolymer with a vinyl acetate content of 19% by weight. The flame retardant agents compared are ultra-fine crystalline aluminium hydroxides with a specific surface of approximately 4m² /g according to BET. The three aluminium hydroxide grades compared with the inventive type are commercially available products.

The mixture was produced on a dispersion kneading device of type LDUK 1.0 manufactured by Werner und Pfleiderer. Test specimens for the subsequent tests were punched out of plates produced by compression molding in a "Schwabenthan press" of type Polystat 300S. The mechanical tests according to DIN 53504 were carried out in a tensile test machine of type Tiratest 2705. The melt flow index to ASTM D 1238 was determined by the Melt Flow Tester 6942 and the oxygen index to ISO 4589 (ASTM D 2863) was determined in a FTA manufactured by Stanton Redcroft.

TABLE 4

| Composition | 4.1 | 4.2 | 4.3 | 4.4 |
|---|---|---|---|---|
| Escorene UL 00119 | 38.3 | 38.3 | 38.3 | 38.3 |
| Dynasylan AMEO | 0.4 | 0.4 | 0.4 | 0.4 |
| Product A | 61.3 | | | |
| Product B | | 61.3 | | |
| Product C | | | 61.13 | |
| Product D | | | | 61.3 |
| Σ | 100 | 100 | 100 | 100 |
| Tensile strength (MPa) | 13.5 | 13.5 | 13.5 | 13.5 |
| Elongation at break (%) | 210 | 210 | 193 | 181 |
| LOI (% $O_2$) | 38.2 | 37.6 | 36.3 | 37.5 |
| MFI (cm³/10 min); 21.6 kg/160° C. | 1.6 | 1.1 | 1.0 | 1.2 |
| MFI (cm³/10 min); 21.6 kg/190° C. | 4.2 | 3.1 | 2.6 | 3.0 |

Escorene UL00119 is an EVA copolymer manufactured by ExxonMobil.
Dynasylan AMEO is an amino silane manufactured by Degussa AG.
Tensile strength - obtained from stress strain measurements according to DIN 53504.
Elongation at break - obtained from the stress strain measurements according to DIN 53504
LOI = limiting oxygen index according to ISO 4589
MFI = melt flow index according to ASTM D 1238.

The comparison shows that the inventive product A exhibits the best values of all products compared. Apart from very advantageous mechanical properties, the melt flow index of formulation 4.1 is at least 35% higher than that of the comparative materials.

Example 6

Table 5) summarizes the compositions and the most important parameters of a polymer compound based on an EVA copolymer with a vinyl acetate content of 26% by weight. The flame retardant agents compared are ultra-fine crystalline aluminium hydroxides with a specific surface of approximately 4 m²/g according to BET. The three aluminium hydroxide grades compared with the inventive type are commercially available products. The compounds and test specimens were produced as described under example 5).

In this formulation, too, the inventive aluminium hydroxide comprises the highest melt flow index by far. As compared to standard grades, the value is increased by at least 25% (see 5.1 compared with 5.2–5.4).

TABLE 5

| Composition | 5.1 | 5.2 | 5.3 | 5.4 |
|---|---|---|---|---|
| Escorene UL 00226 | 38.3 | 38.3 | 38.3 | 38.3 |
| Dynasylan AMEO | 0.4 | 0.4 | 0.4 | 0.4 |
| Product A | 61.3 | | | |
| Product B | | 61.3 | | |
| Product C | | | 61.13 | |
| Product D | | | | 61.3 |
| Σ | 100 | 100 | 100 | 100 |
| Tensile strength (MPa) | 12.6 | 12.2 | 12.0 | 10.5 |
| Elongation at rupture (%) | 243 | 256 | 221 | 220 |
| LOI (% $O_2$) | 37.1 | 36.1 | 36.7 | 37.1 |
| MFI (cm³/10 min); 21.6 kg/160° C. | 3.8 | 3.0 | 2.6 | 3.1 |
| MFI (cm³/10 min); 21.6 kg/190° C. | 10.6 | 8.5 | 7.0 | 7.2 |

Escorene UL00226 is an EVA copolymer manufactured by ExxonMobil.

Example 7

Table 6) summarizes the compositions and the most important parameters of a polymer compound based on an EVA copolymer with a vinyl acetate content of 19% by weight. In the case of this example, ultra-fine crystalline aluminium hydroxides with a specific surface of approximately 6 m²/g according to BET were compared. The inventive type was produced in accordance with the method described under example 2). A comparison was carried out with a commercially available aluminium hydroxide grade.

The compounds and test specimens were produced as described under example 5).

In the case of this example, too, the inventive Product E comprises the superior melt flow index. Apart from better elongation at break values, the MFI values of the inventive product E—depending on measuring conditions, are increased by at least 68%.

TABLE 6

| Composition | 6.1 | 6.2 |
|---|---|---|
| Escorene UL 00119 | 38.3 | 38.3 |
| Dynasylan AMEO | 0.4 | 0.4 |
| Product E | 61.3 | |
| Product F | | 61.3 |
| Σ | 100 | 100 |
| Tensile strength (MPa) | 14.7 | 14.8 |
| Elongation at rupture (%) | 173 | 152 |
| LOI (% $O_2$) | 42.6 | 42.7 |
| MFI (cm³/10 min); 21.6 kg/160° C. | 1.0 | 0.5 |
| MFI (cm³/10 min); 21.6 kg/190° C. | 2.7 | 1.6 |

Example 8

Table 7) summarizes the compositions and the most important parameters of a polymer compound based on an EVA copolymer with a vinyl acetate content of 26% by weight. In the case of this example, the two ultra-fine crystalline aluminium hydroxides of example 7) with a specific surface of approximately 6 m²/g according to BET were compared.

The compounds and test specimens were produced as described under example 5).

Again, the inventive Product E comprises advantageous mechanical properties, a high LOI value and very high melt flow indices.

TABLE 7

| Composition | 7.1 | 7.2 |
|---|---|---|
| Escorene UL 00119 | 38.3 | 38.3 |
| Dynasylan AMEO | 0.4 | 0.4 |
| Product E | 61.3 | |
| Product F | | 61.3 |
| Σ | 100 | 100 |
| Tensile strength (MPa) | 14.9 | 15.2 |
| Elongation at rupture (%) | 206 | 184 |
| LOI (% $O_2$) | 42.3 | 40.6 |
| MFI (cm³/10 min); 21.6 kg/160° C. | 2.6 | 1.7 |
| MFI (cm³/10 min); 21.6 kg/190° C. | 7.3 | 3.9 |

Example 9

Table 8) summarizes the compositions and the most important parameters of a polymer compound based on a PE/EVA blend (EVA with a vinyl acetate content of 26% by weight). The flame retardant agents compared are ultra-fine crystalline aluminium hydroxides with a specific surface of approximately 4 m²/g according to BET. The three aluminium hydroxide grades compared with the inventive type are the commercially available products as used in examples 4) and 5).

The compounds and test specimens were produced as described under example 5).

The results of this compound confirm once again the findings of an increased melt flow index as identified in the preceding examples.

TABLE 8

| Composition | 8.1 | 8.2 | 8.3 | 8.4 |
|---|---|---|---|---|
| Exon Mobile LL 1004 YB | 9.66 | 9.66 | 9.66 | 9.66 |
| Escorene UL 00226 | 29 | 29 | 29 | 29 |
| Silquest FR-693 | 0.8 | 0.8 | 0.8 | 0.8 |
| Silquest PA-826 | 0.30 | 0.30 | 0.30 | 0.30 |
| Interox TMCH-75-AL | 0.04 | 0.04 | 0.04 | 0.04 |
| Irganox 1010 | 0.20 | 0.20 | 0.20 | 0.20 |
| Product A | 60 | | | |
| Product B | | 60 | | |
| Product C | | | 60 | |
| Product D | | | | 60 |
| Σ | 100 | 100 | 100 | 100 |
| Tensile strength (MPa) | 8.5 | 8.7 | 8.6 | 7.4 |
| Elongation at rupture (%) | 200 | 187 | 143 | 118 |
| LOI (% $O_2$) | 36.8 | 35.6 | 33.4 | 33.5 |
| MFI (cm³/10 min); 21.6 kg/160° C. | 6.8 | 5.2 | 5.1 | 5.0 |

Exxon Mobile LL 1004 YB is a LLDPE if ExxonMobile
Silquest FR-693 is a vinyl silane ester of Osi Specialties
Silquest PA-826 is a vilyl-midified polydimethylsiloxane
Interox TMCH-75-AL is a 75% solution of tert. amylperoxy-pivalate in aliphatics, manufactered by Peroxid Chemie
Irganox 1010 is a thermo-stabiliser of a CIBA SC (pentaerythitrol tetrakis3-(3.5-di-tert-butyl-4-hydrophenyl) proprionate Example 10

The comparative product for the subsequent tests was the product with the best comparative values according to Table 8).

Table 9) shows the results of the stress strain tests and the melt flow indices of the compounds of the formulations 8.1 and 8.2 which were produced by a method which was modified as compared to example 9).

In this case, the polymer mixture was produced in a Buss-ko-kneader of type MDK/E 46-11D. Test specimens for the mechanical tests were punched out of extruded strips produced on a single-screw extruder (ED 30-GL manufactured by Extrudex).

With this production method, both the mechanical values and the melt flow indices have improved as compared to the values mentioned in Table 7). In this case, too, the high MFI of the compound containing the inventive product has to be emphasized.

TABLE 9

| Flame retardant agent used | Tensile strength (MPa) | Elong. at rupture (%) | MFI (cm³/10 min) 21.6 kg/160° C. |
|---|---|---|---|
| Product A | 10.2 | 258 | 9.4 |
| Product B | 10.4 | 264 | 5.9 |

Figure 4:
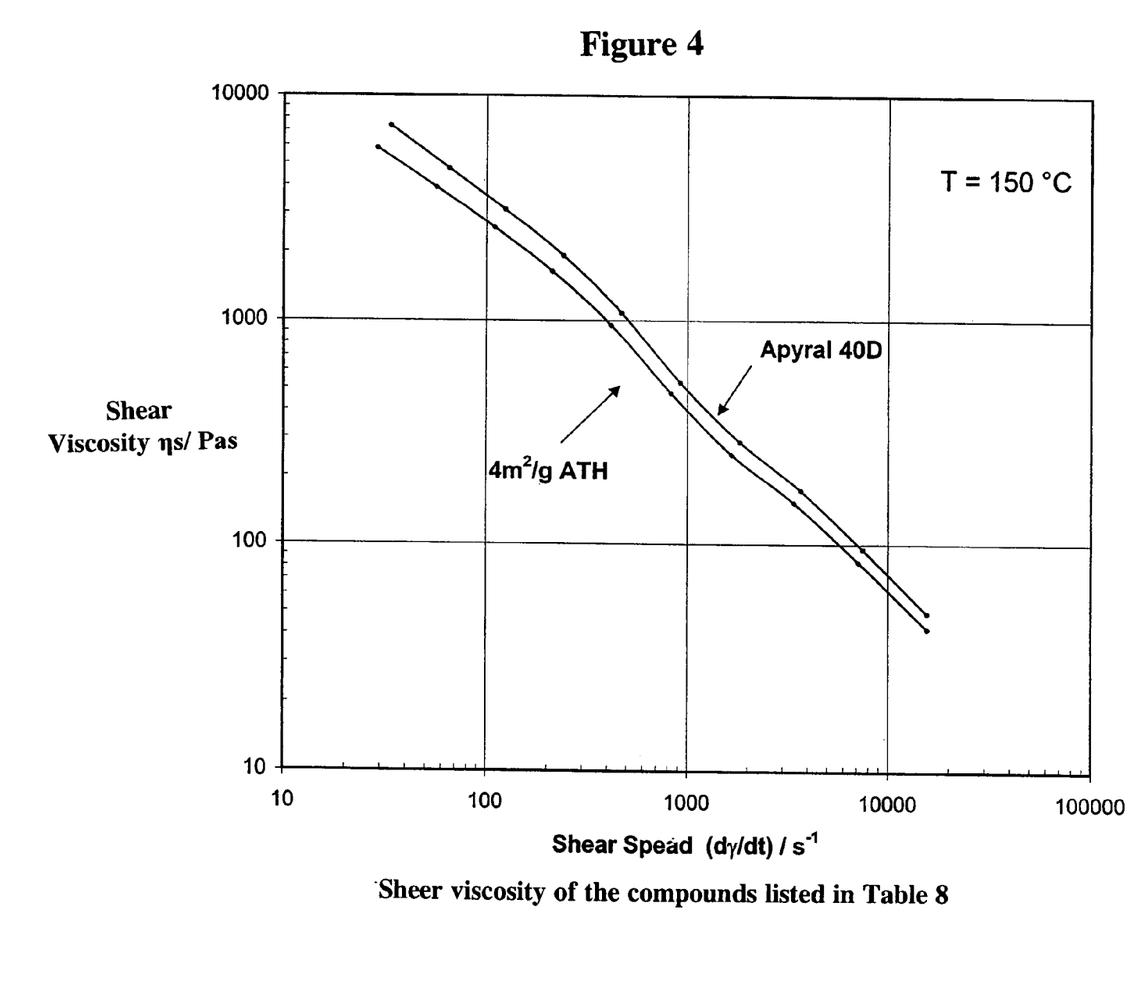

The compounds produced in this way were subjected to melt-rheological measurements in a capillary rheometer (Bohlin, type Rosand RH7-2, measuring temperature 150° C.). FIG. 4) shows the shear viscosity as a function of the shear rate.

In accordance with the MFI values, the composition of the inventive product A, over the entire shear speed range, comprises a lower melt viscosity than the comparative product B.

In addition, both compounds were extruded on a thin round copper conductor with a cross-section of 0.5 mm². Said tests were carried out on a Francis Shaw Extruder provided with a BM screw ("Brevet Mailler"=Maillefer patent) The most important parameters are listed in Table 10).

The compound containing the aluminium hydroxide in accordance with the invention, while the extraction and extrusion temperatures remain the same, can be applied to the copper conductor at a lower pressure and at a lower melt temperature. Vice versa: an increased extraction speed of the insulated copper wire can be achieved by increasing the rotational screw speed to a value in excess of 30 rpm and thus by increasing the melt pressure and melt temperature, for example to the level which sets itself in the case of the compound containing the comparative product B and at a rotational screw speed of 30 rpm. However, the test equipment on which the described tests were carried out was not designed for higher extraction speeds.

TABLE 10

| Filler material | Set parameters | | | Parameters occuring during extrusion | |
|---|---|---|---|---|---|
| | Extraction speed (m/min) | screw speed (rpm) | Nozzle dia. (inner/out.) (mm) | Melt temp. (° C.) | Melt pressure (bar) |
| Product A | 650 | 30 | 0.85/1.4 | 151 | 750 |
| Product B | 650 | 30 | 0.85/1.4 | 168 | 800 |

The invention claimed is:

1. A flame retardant polymer composition comprising
   a) 20–60 percent by weight of a thermoplastic and/or crossed linked or cross-linkable elastomer and
   b) as a flame retardant agent 40–80 percent by weight either of an aluminium hydroxide with the material values
      specific surface according to BET 3–5 $m^2/g$
      mean grain size $d_{50}$ 1.0–1.5 μm
      residual moisture 0.1–0.4%
      oil absorption 19–23%
      water absorption 0.4–0.6 ml/g
   or of an aluminium hydroxide with the material values
      specific surface according to BET 5–8 $m^2/g$
      mean grain size $d_{50}$ 0.8–1.3 μm
      residual moisture 0.1–0.6%
      oil absorption 21–25%
      water absorption 0.6–0.8 ml/g.

2. The flame retardant polymer composition of claim 1, wherein the aluminum hydroxide has a gibbsite structure with, additionally, 0.5 to 1.5% boehmite.

3. A flame retardant polymer composition according to claim 1, wherein the polymer described under a) consists of the group of polyolefins, vinyl polymers, copolymers or terpolymers and grafted polymethylacrylate, natural and synthetic rubbers and their mixtures.

4. A process for producing a flame retardance agent, the flame retardant agent comprising.
   (I) an aluminum hydroxide having:
      (i) a BET specific surface area of 3–5 $m^2/g$,
      (ii) a mean grain size $d_{50}$ of 1.0–1.5 μm,
      (iii) a residual moisture of 0.4%,
      (iv) an oil absorption of 19–23%, and,
      (v) a water absorption of 0.4–0.6 ml/g; or
   (II) an aluminum hydroxide having:
      (i) a BET specific surface area of 5–8 $m^2/g$,
      (ii) a mean grain size $d_{50}$ of 0.8–1.3 μm,
      (iii) a residual moisture of 0.1–0.6%,
      (iv) an oil absorption of 21–25%, and,
      (v) a water absorption of 0.6–0.8 ml/g;
   comprising mill drying a filter-moist aluminum hydroxide having a mean grain size of 0.8 to 1.5 μm obtained by precipitation and filtration in a turbulent hot air stream.

5. The process of claim 4, wherein the mill drying is effected by passing the filter-moist aluminum hydroxide in a hot air stream at a throughput of 3000–7000 $Bm^3/h$ through a rotor rotating at a circumferential speed of 40–140 m/sec, and whirling the hot air stream at a temperature of 150–450° C. at a Reynolds factor greater than 3000.

6. The process of claim 5, wherein the circumferential speed of the rotor is greater than 60 m/sec, thereby converting agglomerates contained in the filter-moist aluminum hydroxide into primary crystals.

7. The process of claim 6, wherein the energy introduced in the hot air stream is in excess of 5000 $Bm^3/h$, at a temperature greater than 270° C. and a circumferential speed of the rotor greater than 70m/sec, thereby converting the gibbsite particles on the surface of the flame retardant agent into boehmite.

8. A method of producing coated electrical conductors and cables comprising extruding the flame retardant polymer composition of claim 1.

9. The method of claim 4 wherein after mill drying, the filter-moist aluminum hydroxide $d_{50}$ grain distribution is within about 15% of its original value, and the BET surface is increased by at least 20%.

10. The composition of claim 3, wherein the melt flow index of the polymer composition is increased by at least 20% compared to standard aluminum hydroxides.

* * * * *